United States Patent
Miralles et al.

(10) Patent No.: US 10,703,506 B2
(45) Date of Patent: *Jul. 7, 2020

(54) SYSTEMS AND DEVICES FOR REMOTELY OPERATED UNMANNED AERIAL VEHICLE REPORT-SUPPRESSING LAUNCHER WITH PORTABLE RF TRANSPARENT LAUNCH TUBE

(71) Applicant: AEROVIRONMENT, INC., Simi Valley, CA (US)

(72) Inventors: Carlos Thomas Miralles, Burbank, CA (US); Guan H Su, Rowland Heights, CA (US); Alexander Andryukov, Simi Valley, CA (US); John McNeil, Tujunga, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/574,344

(22) Filed: Sep. 18, 2019

(65) Prior Publication Data
US 2020/0140120 A1    May 7, 2020

Related U.S. Application Data

(63) Continuation of application No. 16/137,196, filed on Sep. 20, 2018, now Pat. No. 10,450,089, which is a
(Continued)

(51) Int. Cl.
*B64F 1/04* (2006.01)
*B64C 39/02* (2006.01)
(Continued)

(52) U.S. Cl.
CPC .............. *B64F 1/04* (2013.01); *B64C 39/024* (2013.01); *B64F 1/06* (2013.01); *F41A 21/02* (2013.01);
(Continued)

(58) Field of Classification Search
CPC .............. B64C 39/024; B64F 1/04; B64F 1/06
See application file for complete search history.

(56) References Cited

U.S. PATENT DOCUMENTS

| 2,512,069 A | 6/1950 | Mull |
| 2,752,110 A | 6/1956 | Peterson |

(Continued)

FOREIGN PATENT DOCUMENTS

| CA | 2659111 C | 7/2011 |
| CN | 85104530 A | 1/1987 |

(Continued)

OTHER PUBLICATIONS

Aerovironment,Inc. et al, International Search Reports for Serial No. PCT/US2010/048313 dated May 26, 2011.
(Continued)

*Primary Examiner* — Justin M Benedik
(74) *Attorney, Agent, or Firm* — Brooks Acordia IP Law, PC; Pejman Yedidsion; Eric Aagaard

(57) ABSTRACT

An unmanned aerial vehicle (UAV) launch tube that comprises at least one inner layer of prepreg substrate disposed about a right parallelepiped aperture, at least one outer layer of prepreg substrate disposed about the right parallelepiped aperture, and one or more structural panels disposed between the at least one inner layer of prepreg substrate and the at least one outer layer of prepreg substrate. An unmanned aerial vehicle (UAV) launch tube that comprises a tethered sabot configured to engage a UAV within a launcher volume defined by an inner wall, the tethered sabot dimensioned to provide a pressure seal at the inner wall and tethered to the inner wall, and wherein the tethered sabot is hollow having an open end oriented toward a high pressure volume and a tether attached within a hollow of the sabot and attached to the inner wall retaining the high pressure volume or attach to the inner base wall. A system comprising
(Continued)

a communication node and a launcher comprising an unmanned aerial vehicle (UAV) in a pre-launch state configured to receive and respond to command inputs from the communication node.

20 Claims, 11 Drawing Sheets

Related U.S. Application Data continuation of application No. 14/887,675, filed on Oct. 20, 2015, now Pat. No. 10,124,909, which is a continuation of application No. 13/234,044, filed on Sep. 15, 2011, now Pat. No. 9,187,184, which is a continuation of application No. 13/229,377, filed on Sep. 9, 2011, now Pat. No. 8,505,430, which is a continuation of application No. PCT/US2010/048313, filed on Sep. 9, 2010.

(60) Provisional application No. 61/240,987, filed on Sep. 9, 2009, provisional application No. 61/241,001, filed on Sep. 9, 2009, provisional application No. 61/240,996, filed on Sep. 9, 2009.

(51) Int. Cl.
| | |
|---|---|
| *B64F 1/06* | (2006.01) |
| *F41A 21/02* | (2006.01) |
| *F41F 1/00* | (2006.01) |
| *F41F 3/042* | (2006.01) |
| *F42B 39/14* | (2006.01) |

(52) U.S. Cl.
CPC .............. *F41F 1/00* (2013.01); *F41F 3/042* (2013.01); *F42B 39/14* (2013.01); *B64C 2201/08* (2013.01); *B64C 2201/102* (2013.01); *B64C 2201/146* (2013.01); *B64C 2201/201* (2013.01)

(56) References Cited

U.S. PATENT DOCUMENTS

| | | | |
|---|---|---|---|
| 2,792,962 A | | 5/1957 | Granfelt |
| 2,996,011 A | | 8/1961 | Dunlap |
| 3,083,936 A | | 4/1963 | Rethorst |
| 3,107,616 A | | 10/1963 | Boaz et al. |
| 3,107,617 A | | 10/1963 | F et al. |
| 3,147,939 A | | 9/1964 | Clarkson |
| 3,223,361 A | | 12/1965 | Girard |
| 3,262,391 A | | 7/1966 | Shober |
| 3,306,163 A | | 2/1967 | Griessen |
| 3,347,466 A | | 10/1967 | Nichols |
| 3,415,467 A | | 12/1968 | Barringer |
| 3,724,319 A | * | 4/1973 | Zabelka et al. |
| 3,789,353 A | | 1/1974 | Hunter et al. |
| 3,808,940 A | | 5/1974 | Schillreff et al. |
| 3,916,560 A | | 11/1975 | Becker |
| 3,939,967 A | * | 2/1976 | Tenney et al. |
| 4,022,403 A | | 5/1977 | Chiquet |
| 4,090,684 A | | 5/1978 | Look et al. |
| 4,106,727 A | | 8/1978 | Ortell |
| 4,209,147 A | | 6/1980 | Jones |
| 4,277,038 A | | 7/1981 | Yates et al. |
| 4,296,894 A | | 10/1981 | Schnabele et al. |
| 4,301,708 A | | 11/1981 | Mussey |
| 4,354,646 A | | 10/1982 | Raymer |
| 4,364,531 A | | 12/1982 | Knoski |
| 4,383,663 A | | 5/1983 | Nichols |
| 4,408,538 A | | 10/1983 | Deffayet et al. |
| 4,410,151 A | * | 10/1983 | Hoppner et al. |
| 4,541,593 A | | 9/1985 | Cabrol |
| 4,553,718 A | | 11/1985 | Pinson |
| 4,568,040 A | | 2/1986 | Metz |
| 4,590,862 A | | 5/1986 | Grabarek et al. |
| 4,664,338 A | | 5/1987 | Steuer et al. |
| H400 H | | 1/1988 | Hammon et al. |
| 4,730,793 A | | 3/1988 | Thurber, Jr. et al. |
| 4,735,148 A | | 4/1988 | Holtzman et al. |
| 4,776,255 A | * | 10/1988 | Smith |
| 4,841,867 A | | 6/1989 | Garrett |
| 4,958,571 A | | 9/1990 | Puckett |
| 4,990,921 A | | 2/1991 | Chisholm |
| 4,997,144 A | | 3/1991 | Wolff et al. |
| D317,003 S | | 5/1991 | Tribe et al. |
| 5,106,033 A | | 4/1992 | Phan |
| 5,112,006 A | | 5/1992 | Palmer |
| 5,115,711 A | * | 5/1992 | Bushagour et al. |
| 5,118,052 A | | 6/1992 | Alvarez Calderon F |
| 5,141,175 A | | 8/1992 | Harris |
| 5,193,517 A | * | 3/1993 | Taylor et al. |
| 5,303,695 A | | 4/1994 | Shopsowitz |
| 5,322,243 A | | 6/1994 | Stoy |
| 5,370,032 A | | 12/1994 | Reuche et al. |
| 5,417,139 A | * | 5/1995 | Boggs et al. |
| 5,458,041 A | | 10/1995 | Sun et al. |
| 5,458,042 A | * | 10/1995 | Cante |
| 5,566,073 A | | 10/1996 | Margolin |
| 5,581,250 A | | 12/1996 | Khvilivitzky |
| 5,582,364 A | | 12/1996 | Trulin et al. |
| 5,615,846 A | | 4/1997 | Shmoldas et al. |
| 5,671,138 A | | 9/1997 | Bessacini et al. |
| 5,671,899 A | | 9/1997 | Nicholas et al. |
| 5,695,153 A | | 12/1997 | Britton et al. |
| 5,722,618 A | | 3/1998 | Jacobs et al. |
| 5,780,766 A | | 7/1998 | Schroppel |
| 5,819,717 A | * | 10/1998 | Johnson et al. |
| 5,833,782 A | | 11/1998 | Crane et al. |
| 5,855,339 A | | 1/1999 | Mead et al. |
| 5,874,727 A | | 2/1999 | Harraeus et al. |
| 5,884,872 A | | 3/1999 | Greenhalgh |
| 5,890,441 A | | 4/1999 | Swinson et al. |
| 5,899,410 A | | 5/1999 | Garrett |
| 5,904,724 A | | 5/1999 | Margolin |
| 5,927,648 A | | 7/1999 | Woodland |
| 5,933,263 A | | 8/1999 | Kinstler |
| 5,965,836 A | * | 10/1999 | Rakov |
| D417,639 S | | 12/1999 | Carichner et al. |
| 6,043,867 A | | 3/2000 | Saban |
| 6,053,452 A | | 4/2000 | Yamakawa et al. |
| 6,056,237 A | * | 5/2000 | Woodland |
| 6,122,572 A | | 9/2000 | Yavnai |
| 6,244,535 B1 | | 6/2001 | Felix |
| 6,354,182 B1 | | 3/2002 | Milanovich |
| 6,359,833 B1 | | 3/2002 | English |
| 6,371,002 B1 | * | 4/2002 | MacLeod |
| 6,392,213 B1 | | 5/2002 | Martorana et al. |
| 6,418,870 B1 | | 7/2002 | Lanowy et al. |
| 6,422,507 B1 | | 7/2002 | Lipeles |
| D461,159 S | | 8/2002 | Miralles |
| 6,467,733 B1 | | 10/2002 | Young et al. |
| 6,496,151 B1 | | 12/2002 | Ferreri et al. |
| 6,535,816 B1 | | 3/2003 | Smith |
| 6,567,044 B2 | | 5/2003 | Carroll |
| 6,568,309 B2 | | 5/2003 | MacLeod |
| 6,571,715 B1 | | 6/2003 | Bennett et al. |
| 6,601,795 B1 | | 8/2003 | Chen |
| 6,672,533 B1 | | 1/2004 | Regebro |
| 6,678,394 B1 | | 1/2004 | Nichani |
| 6,722,252 B1 | | 4/2004 | O'Dwyer |
| 6,847,865 B2 | | 1/2005 | Carroll |
| 6,851,347 B1 | | 2/2005 | Plunkett |
| 6,851,647 B1 | * | 2/2005 | Rosenbaum et al. |
| 6,923,404 B1 | | 8/2005 | Liu et al. |
| 6,931,775 B2 | | 8/2005 | Burnett |
| 6,967,614 B1 | | 11/2005 | Wardell et al. |
| 6,978,970 B2 | | 12/2005 | Purcell |
| 7,014,141 B2 | | 3/2006 | Cox et al. |
| 7,083,140 B1 | | 8/2006 | Dooley |
| 7,093,789 B2 | | 8/2006 | Barocela et al. |
| 7,207,254 B2 | | 4/2007 | Veitch et al. |
| 7,210,654 B1 | | 5/2007 | Cox et al. |

(56) References Cited

U.S. PATENT DOCUMENTS

| | | | |
|---|---|---|---|
| 7,216,429 B2 | 5/2007 | Logan et al. |
| 7,237,750 B2 | 7/2007 | Chiu et al. |
| 7,275,973 B2 | 10/2007 | Ong |
| 7,299,130 B2 | 11/2007 | Mulligan et al. |
| 7,302,316 B2 | 11/2007 | Beard et al. |
| 7,338,010 B2 | 3/2008 | Corder et al. |
| 7,343,232 B2 | 3/2008 | Duggan et al. |
| 7,367,525 B2 | 5/2008 | McKendree et al. |
| 7,398,721 B1* | 7/2008 | Alberding et al. |
| 7,414,706 B2 | 8/2008 | Nichols et al. |
| 7,484,450 B2* | 2/2009 | Hunn et al. |
| 7,520,204 B2 | 4/2009 | Williams et al. |
| 7,559,505 B2 | 7/2009 | Janka |
| 7,581,702 B2 | 9/2009 | Olson et al. |
| 7,584,925 B2 | 9/2009 | Miller et al. |
| 7,631,833 B1 | 12/2009 | Ghaleb et al. |
| 7,742,436 B2 | 6/2010 | Carrillo et al. |
| 7,793,606 B2 | 9/2010 | LaCour |
| 7,800,645 B2 | 9/2010 | Nonoyama et al. |
| 7,816,635 B2 | 10/2010 | Fink |
| 7,841,559 B1 | 11/2010 | O'Shea |
| 7,883,051 B2 | 2/2011 | Sammy |
| 7,900,869 B2 | 3/2011 | Kessler et al. |
| 7,934,456 B1 | 5/2011 | Heitmann et al. |
| 8,056,480 B2* | 11/2011 | Brydges-Price |
| 8,068,983 B2 | 11/2011 | Vian et al. |
| 8,089,033 B2 | 1/2012 | Zank et al. |
| 8,089,034 B2 | 1/2012 | Hammerquist |
| 8,109,212 B2 | 2/2012 | O'Dwyer |
| 8,178,825 B2 | 5/2012 | Goossen et al. |
| 8,424,233 B2 | 4/2013 | Cronin et al. |
| 8,439,301 B1 | 5/2013 | Lussier et al. |
| 8,444,082 B1 | 5/2013 | Foch |
| 8,505,430 B2* | 8/2013 | Miralles et al. |
| 8,657,226 B1 | 2/2014 | McGinnis |
| 8,686,326 B1 | 4/2014 | Dennison et al. |
| 8,692,171 B2 | 4/2014 | Miller et al. |
| 8,887,641 B1 | 11/2014 | Manole et al. |
| 8,924,069 B1 | 12/2014 | Kaneshige et al. |
| 8,985,504 B2 | 3/2015 | Tao et al. |
| 9,108,713 B2 | 8/2015 | Tao et al. |
| 9,187,184 B2 | 11/2015 | Miralles et al. |
| 9,703,295 B1 | 7/2017 | Neal et al. |
| D813,761 S | 3/2018 | Balaresque et al. |
| 9,947,230 B2 | 4/2018 | Hu et al. |
| 2002/0030142 A1 | 3/2002 | James |
| 2002/0062730 A1 | 5/2002 | Thornton |
| 2003/0006340 A1 | 1/2003 | Harrison et al. |
| 2003/0089219 A1 | 5/2003 | Gorman |
| 2003/0094536 A1 | 5/2003 | LaBiche |
| 2003/0136873 A1 | 7/2003 | Churchman |
| 2003/0155463 A1 | 8/2003 | Cox et al. |
| 2003/0173459 A1 | 9/2003 | Fanucci et al. |
| 2003/0178527 A1 | 9/2003 | Eisentraut et al. |
| 2003/0192985 A1 | 10/2003 | Lipeles |
| 2004/0030449 A1 | 2/2004 | Solomon |
| 2004/0068351 A1 | 4/2004 | Solomon |
| 2004/0167682 A1 | 8/2004 | Beck et al. |
| 2004/0194614 A1 | 10/2004 | Wang |
| 2004/0217230 A1 | 11/2004 | Fanucci et al. |
| 2005/0004723 A1 | 1/2005 | Duggan et al. |
| 2005/0004759 A1 | 1/2005 | Siegel |
| 2005/0011397 A1 | 1/2005 | Eches |
| 2005/0051667 A1 | 3/2005 | Arlton et al. |
| 2005/0077424 A1 | 4/2005 | Schneider |
| 2005/0127242 A1 | 6/2005 | Rivers |
| 2005/0139363 A1 | 6/2005 | Thomas |
| 2005/0178898 A1 | 8/2005 | Yuen |
| 2005/0195096 A1 | 9/2005 | Ward et al. |
| 2005/0204910 A1 | 9/2005 | Padan |
| 2005/0218260 A1 | 10/2005 | Corder et al. |
| 2005/0255842 A1 | 11/2005 | Dumas et al. |
| 2005/0258306 A1 | 11/2005 | Barocela et al. |
| 2005/0274845 A1* | 12/2005 | Miller et al. |
| 2006/0011777 A1 | 1/2006 | Arlton et al. |
| 2006/0086241 A1 | 4/2006 | Miller et al. |
| 2006/0132753 A1 | 6/2006 | Nichols et al. |
| 2006/0253254 A1 | 11/2006 | Herwitz |
| 2006/0255205 A1 | 11/2006 | Gleich et al. |
| 2007/0018033 A1 | 1/2007 | Fanucci et al. |
| 2007/0023582 A1 | 2/2007 | Steele et al. |
| 2007/0057115 A1 | 3/2007 | Newton |
| 2007/0125904 A1 | 6/2007 | Janka |
| 2007/0152098 A1 | 7/2007 | Sheahan et al. |
| 2007/0157843 A1 | 7/2007 | Roemerman et al. |
| 2007/0158911 A1 | 7/2007 | Torre |
| 2007/0210953 A1 | 9/2007 | Abraham et al. |
| 2007/0215751 A1 | 9/2007 | Robbins et al. |
| 2007/0246601 A1 | 10/2007 | Layton |
| 2008/0041221 A1 | 2/2008 | Gaigler |
| 2008/0071431 A1 | 3/2008 | Dockter et al. |
| 2008/0074312 A1 | 3/2008 | Cross et al. |
| 2008/0078865 A1 | 4/2008 | Burne |
| 2008/0087763 A1 | 4/2008 | Sheahan et al. |
| 2008/0088719 A1 | 4/2008 | Jacob et al. |
| 2008/0093501 A1 | 4/2008 | Miller et al. |
| 2008/0111021 A1 | 5/2008 | Toth et al. |
| 2008/0133069 A1 | 6/2008 | Rica et al. |
| 2008/0148927 A1 | 6/2008 | Alberding et al. |
| 2008/0177432 A1 | 7/2008 | Deker et al. |
| 2008/0206718 A1 | 8/2008 | Jaklitsch et al. |
| 2008/0215195 A1 | 9/2008 | Jourdan et al. |
| 2008/0217486 A1 | 9/2008 | Colten et al. |
| 2008/0243371 A1 | 10/2008 | Builta et al. |
| 2009/0007765 A1 | 1/2009 | Hunn et al. |
| 2009/0008495 A1 | 1/2009 | Koenig |
| 2009/0045290 A1 | 2/2009 | Small et al. |
| 2009/0050750 A1 | 2/2009 | Goossen |
| 2009/0100995 A1 | 4/2009 | Fisher |
| 2009/0114762 A1 | 5/2009 | Hurty |
| 2009/0134273 A1 | 5/2009 | Page et al. |
| 2009/0157233 A1 | 6/2009 | Kokkeby et al. |
| 2009/0193996 A1 | 8/2009 | Brydges-Price |
| 2009/0242690 A1 | 10/2009 | Sammy |
| 2009/0302151 A1 | 12/2009 | Holmes |
| 2009/0321094 A1 | 12/2009 | Thomas |
| 2010/0012774 A1 | 1/2010 | Fanucci et al. |
| 2010/0025543 A1 | 2/2010 | Kinsey et al. |
| 2010/0042269 A1 | 2/2010 | Kokkeby et al. |
| 2010/0042273 A1 | 2/2010 | Meunier et al. |
| 2010/0121575 A1 | 5/2010 | Aldridge et al. |
| 2010/0141503 A1 | 6/2010 | Baumatz |
| 2010/0198514 A1 | 8/2010 | Miralles |
| 2010/0212479 A1 | 8/2010 | Heitmann |
| 2010/0213309 A1 | 8/2010 | Parks |
| 2010/0264260 A1 | 10/2010 | Hammerquist |
| 2010/0281745 A1 | 11/2010 | Condon et al. |
| 2010/0282917 A1 | 11/2010 | O'Shea |
| 2010/0314487 A1 | 12/2010 | Boelitz et al. |
| 2011/0035149 A1 | 2/2011 | McAndrew et al. |
| 2011/0057070 A1 | 3/2011 | Lance et al. |
| 2011/0084162 A1 | 4/2011 | Goossen et al. |
| 2011/0146525 A1 | 6/2011 | Caillat |
| 2011/0226174 A1 | 9/2011 | Parks |
| 2012/0000390 A1 | 1/2012 | Heitmann |
| 2012/0068002 A1 | 3/2012 | Unger et al. |
| 2012/0205488 A1 | 8/2012 | Powell et al. |
| 2012/0267473 A1 | 10/2012 | Tao et al. |
| 2014/0172200 A1 | 6/2014 | Miralles |
| 2015/0008280 A1 | 1/2015 | Smoker |
| 2015/0053193 A1 | 2/2015 | Pruett et al. |

FOREIGN PATENT DOCUMENTS

| | | |
|---|---|---|
| CN | 2769834 Y | 4/2006 |
| CN | 200960979 | 10/2007 |
| CN | 200967562 | 10/2007 |
| CN | 200967562 Y | 10/2007 |
| CN | 101198520 A | 6/2008 |
| CN | 101249891 A | 8/2008 |
| CN | 101473184 A | 7/2009 |
| CN | 101495367 A | 7/2009 |
| DE | 3048598 C2 | 4/1990 |
| GB | 2188713 A | 10/1987 |

(56) References Cited

FOREIGN PATENT DOCUMENTS

| | | | |
|---|---|---|---|
| GB | 2434783 | A | 8/2007 |
| JP | 60188799 | | 9/1985 |
| JP | S60188799 | A | 9/1985 |
| JP | 64028096 | | 1/1989 |
| JP | 02291703 | | 12/1990 |
| JP | 05106997 | | 4/1993 |
| JP | 1993106997 | | 4/1993 |
| JP | 05149696 | | 6/1993 |
| JP | 06273098 | | 9/1994 |
| JP | 07089492 | | 4/1995 |
| JP | H0789492 | A | 4/1995 |
| JP | 09026300 | | 1/1997 |
| JP | 2000266499 | A | 9/2000 |
| JP | 2001153599 | A | 6/2001 |
| JP | 2001206298 | | 7/2001 |
| JP | 2003177000 | A | 6/2003 |
| JP | 2004271216 | | 9/2004 |
| JP | 2005500774 | A | 1/2005 |
| JP | 2005067398 | A | 3/2005 |
| JP | 2005240841 | A | 9/2005 |
| JP | 2007228065 | A | 9/2007 |
| JP | 2008536736 | A | 9/2008 |
| WO | 9712195 | A | 4/1997 |
| WO | 03017419 | A1 | 2/2003 |
| WO | 2003017419 | A1 | 2/2003 |
| WO | 2005001372 | A2 | 1/2005 |
| WO | 2005023642 | A2 | 3/2005 |
| WO | 2006097592 | A1 | 9/2006 |
| WO | 2008020448 | A2 | 2/2008 |

OTHER PUBLICATIONS

Andreas Parsch; Coyote; Advanced Ceramics Research; 2006; . (Year: 2006).
BusinessWire; First Test Flight of Coyote Unmanned Aircraft System; Jan. 19, 2010; YouTube; ,https://www.youtube.com/watch?v=0MmdHLRxIN4>. (Year: 2010).
International Search Repot for Serial No. PCT/US2010/048313 dated May 26, 2011.
European Search Report for EP Application No. EP 10833732, dated Jun. 1, 2015.
European Search Report for Serial No. EP161799150 dated Jan. 17, 2017.
International Search Report for PCT/US2010/048323 dated Jun. 20, 2011.
International Search Report for Serial No. PCT/US10/22942 dated Sep. 27, 2010.
International Search Report for Serial No. PCT/US2010/048323 dated Jun. 20, 2011.
International Search Report for serial No. PCT/US2010/048313 dated May 26, 2011.
Supplementary EP Search Report for EP Serial No. EP10833731 completed Nov. 4, 2014.
Tares Unmanned Combat Air Vehicle (UCAV), Germany, [retrieved on Feb. 24, 2010], Retrieved from the Internet:.
Tares Unmanned Combat Air Vehicle (UCAV), Germany, [retrieved on Feb. 24, 2010], Retrieved from the Internet:<URL:http://www.army-technology.com/projects/taifun/>.
Wikipedia, "Sabot", https://en.wikipedia.org/wiki/Sabot; archived on Feb. 24, 2011 by Internet Archive, https://web.archive.org/web/20100224075656/https://en.wikipedia.org/wiki/Sabot; accessed Oct. 10, 2018 (Year:2011).

* cited by examiner

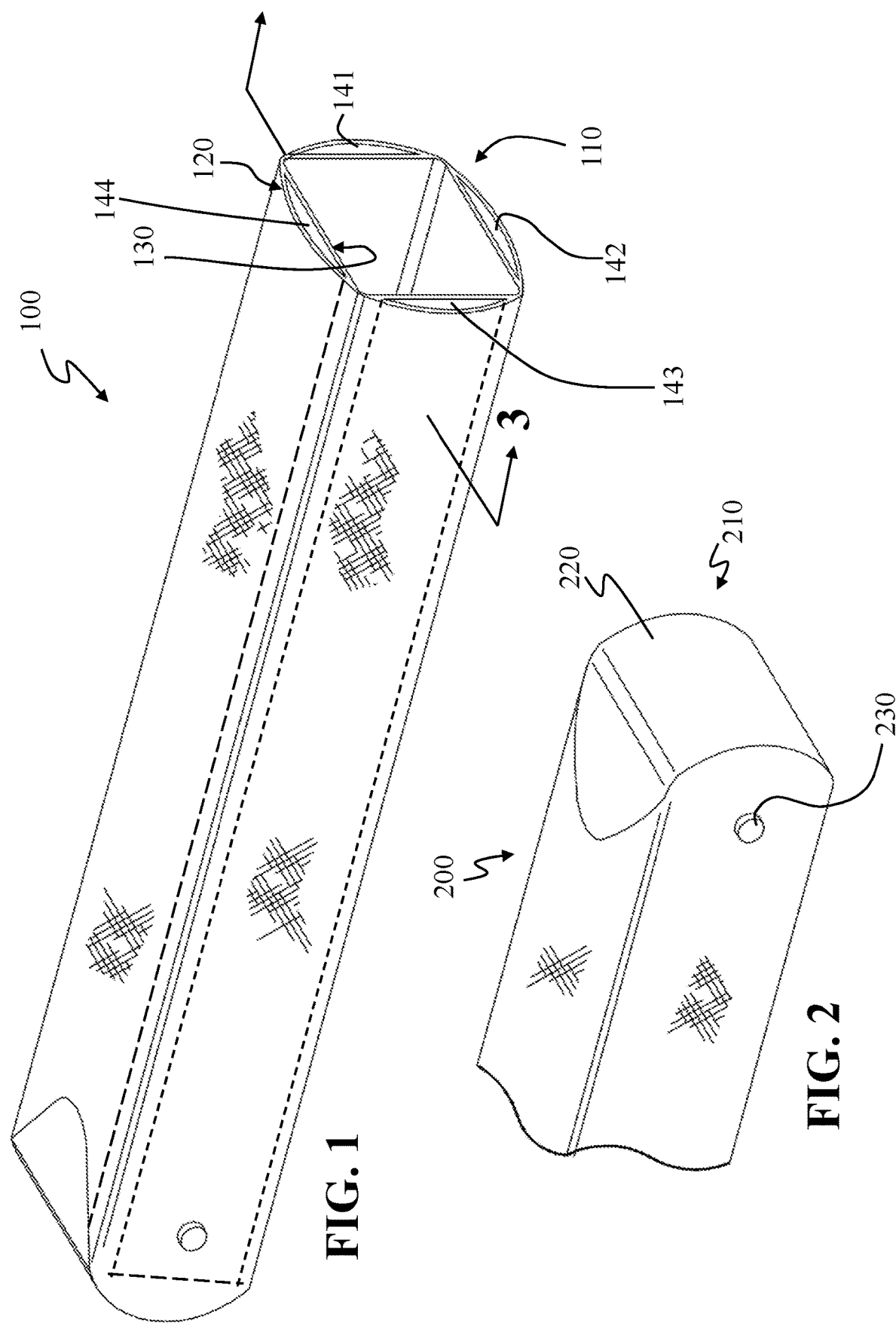

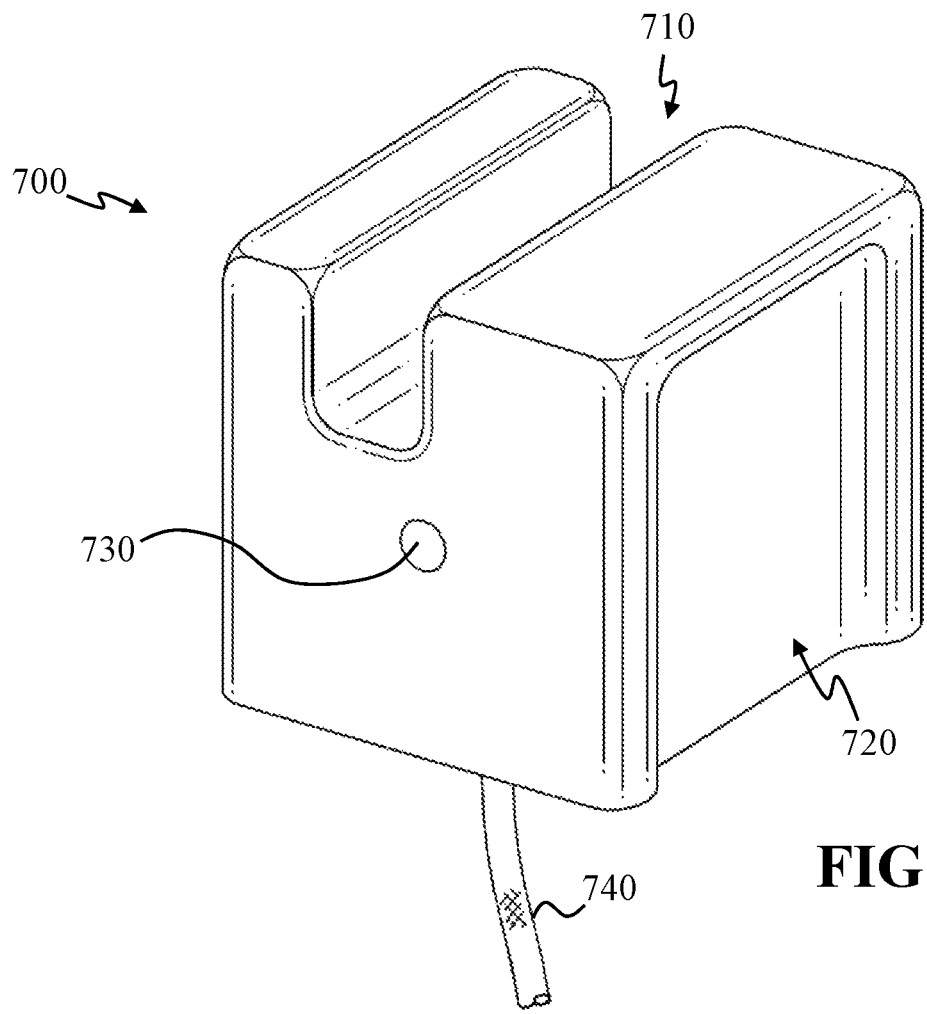
FIG. 7
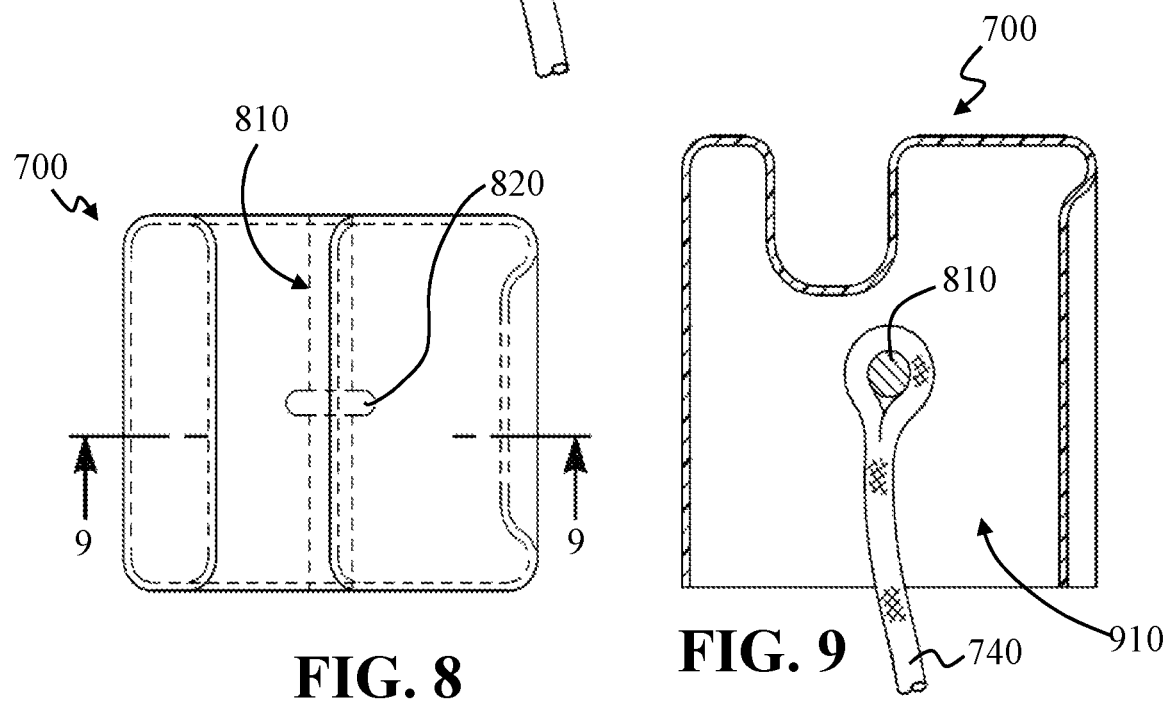
FIG. 8
FIG. 9

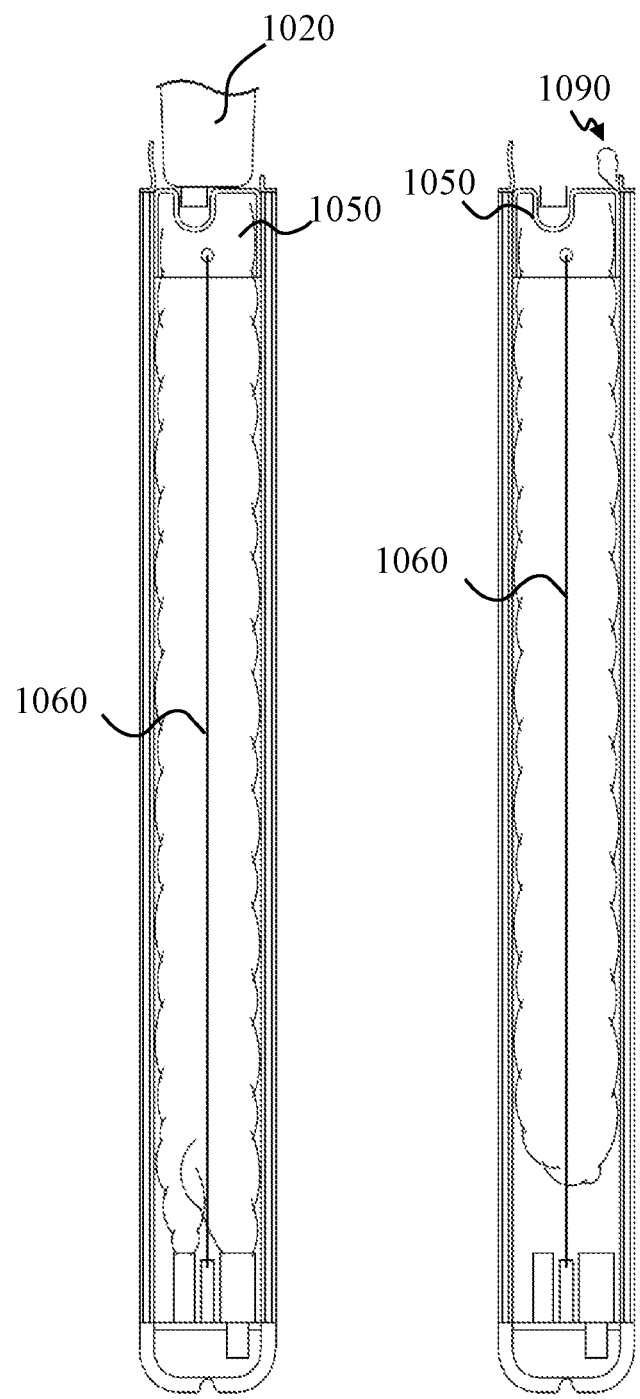
FIG. 10D   FIG. 10E

SYSTEMS AND DEVICES FOR REMOTELY OPERATED UNMANNED AERIAL VEHICLE REPORT-SUPPRESSING LAUNCHER WITH PORTABLE RF TRANSPARENT LAUNCH TUBE

CROSS-REFERENCE TO RELATED APPLICATIONS

This application is a continuation of patent application Ser. No. 16/137,196 filed Sep. 20, 2018, which is a continuation of patent application Ser. No. 14/887,675 filed Oct. 20, 2015, which issued as U.S. Pat. No. 10,124,909 on Nov. 13, 2018, which is a continuation of patent application Ser. No. 13/234,044, filed Sep. 15, 2011, which issued as U.S. Pat. No. 9,187,184 on Nov. 17, 2015, which is a continuation of patent application Ser. No. 13/229,377, filed Sep. 9, 2011, which issued as U.S. Pat. No. 8,505,430 on Aug. 13, 2013, which is a continuation of International Application No. PCT/US2010/048313, filed Sep. 9, 2010, which claims priority to and the benefit of U.S. Provisional Patent Application Ser. No. 61/240,996 filed Sep. 9, 2009, U.S. Provisional Patent Application Ser. No. 61/240,987 filed Sep. 9, 2009, and U.S. Provisional Patent Application Ser. No. 61/241,001 filed Sep. 9, 2009, all of which are hereby incorporated herein by reference in their entirety for all purposes.

TECHNICAL FIELD

Embodiments include launch tubes and canisters, report-suppressing launch tubes, and sabots for an unmanned aerial vehicle (UAV). Embodiments also pertain to systems comprising one or more UAVs, and to a system comprising a command node and a launcher containing a UAV in a pre-launch state configured to receive command signals from the command node.

BACKGROUND

Typically UAVs are shipped to a launch site in an unassembled state. At the site they are assembled, tested, and then launched. Launching is typically executed by hand, by an elastic tether, a powered wench, from a moving vehicle, or some combination thereof. Such methods can be time consuming and/or cumbersome. Once launched, a UAV may receive uplinks and may be guided by a human-in-the-loop, a human intermittently up-linking course corrections, e.g., via supervisory control, or by a preloaded intercept/strike point in combination with an onboard flight path guidance generator and outputs of inertial sensors and/or from a Global Positioning System (GPS) receiver.

SUMMARY

Embodiments may include articles such as an unmanned aerial vehicle (UAV) launch tube comprising: (a) at least one inner layer of prepreg substrate disposed about a right parallelepiped aperture; (b) at least one outer layer of prepreg substrate disposed about the right parallelepiped aperture; and (c) one or more structural panels disposed between the at least one inner layer of prepreg substrate and the at least one outer layer of prepreg substrate. The at least one inner layer of prepreg substrate may comprise epoxy prepreg Kevlar™ or other light weight composites. The at least one outer layer of prepreg substrate may comprise epoxy prepreg Kevlar™ or other light weight composites.

The one or more structural panels may comprise balsawood or a light weight composite. In some embodiments, the one or more structural panels may comprise four structural panels, where each panel comprises a cylindrical segment, and each panel has a planar surface defined by a chord length and a cylindrical height. Each proximate planar surface may be disposed orthogonally relative to one another, each structural panel having a first lateral edge and a second lateral edge perpendicular to the chord length, where the first lateral edge of a first structural panel is proximate to, but not contacting, a first lateral edge of a second structural panel. The second lateral edge of the first structural panel may be proximate to, but not contacting, a first lateral edge of a third structural panel. The first lateral edge of a fourth structural panel may be proximate to, but not contacting, a second lateral edge of a second structural panel. The second lateral edge of the fourth structural panel may be proximate to, but not contacting, a second lateral edge of a third structural panel, where the planar surfaces of each of the four structural panels may be aligned with a launch tube centerline. In addition, each of the four structural panels may be disposed between the inner layer of epoxy prepreg substrate and the outer layer of epoxy prepreg substrate. Embodiments include articles such as an unmanned aerial vehicle (UAV) launch tube configured for report suppression comprising a structural element configured to engage the UAV within a launcher volume defined by an inner wall. The article may be dimensioned to provide a pressure seal at the inner wall and tethered to the inner wall. The structural element may have a hollow, or cavity, having an open end oriented toward a high pressure volume and a tether attached within a hollow or cavity of the article and may be attached to the inner wall retaining the high pressure volume.

Additional embodiments may include methods and UAV systems comprising: (a) a communications node; and (b) a launcher comprising a UAV configured to receive, in a pre-launch state, command inputs from the communications node. In some embodiments, the UAV in a pre-launch state is further configured to transmit to a communications node UAV status data responsive to a received query signal. In some embodiments, the RF antenna of the UAV is contained within the launcher volume. In some embodiments, the launch propulsion system is configured to receive RF signals.

BRIEF DESCRIPTION OF THE DRAWINGS

Embodiments are illustrated by way of example and not limitation in the figures of the accompanying drawings, and in which:

FIG. 1 is a top-side perspective view of an exemplary launch tube embodiment;

FIG. 2 is a bottom-side perspective view of a portion of an exemplary launch tube embodiment;

FIG. 7 is a top-side perspective view of an exemplary tethered sabot embodiment of the present invention;

FIG. 8 is a top view of an exemplary tethered sabot embodiment of the present invention;

FIG. 9 is a cross-sectional view of an exemplary tethered sabot embodiment of the present invention;

FIGS. 10A-10E depict an exemplary UAV launch using a tethered sabot embodiment of the present invention;

DETAILED DESCRIPTION

Figure 3:
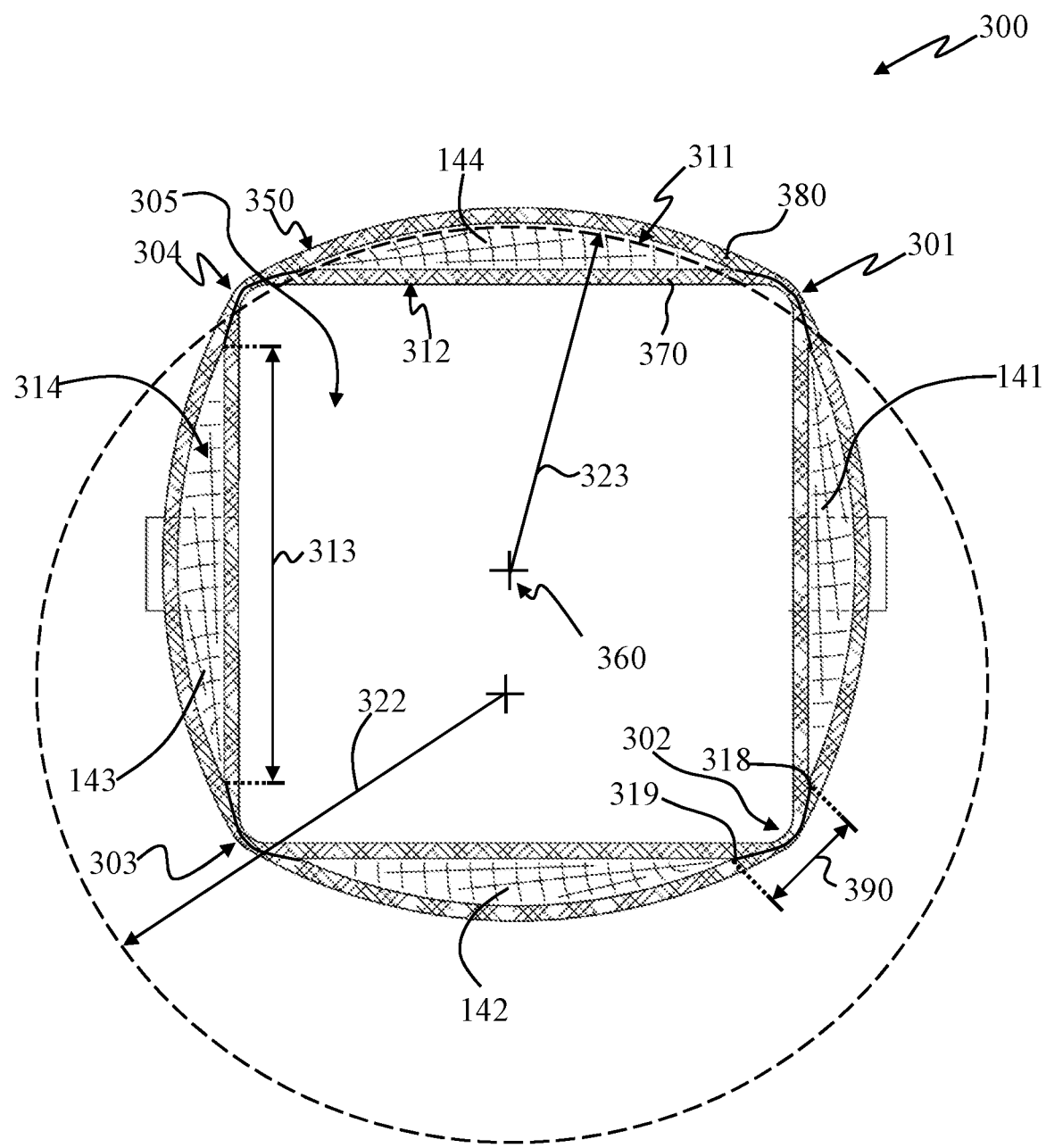
FIG. 3 is cross-sectional view of an exemplary launch tube embodiment.

FIG. 1 is a top-side perspective view of an exemplary launch tube 100 embodiment. The top, or open end 110, of the exemplary launch tube presents a square-shaped aperture having rounded corners. Disposed between an outer layer of prepreg substrate 120 and an inner layer of prepreg substrate 130 are four structural panels 141-144.

FIG. 2 is a bottom-side perspective view of a portion of an exemplary launch tube embodiment 200. The bottom, or closed end 210, of the exemplary launch tube presents an end 220 curved about an axis collinear with a first footing pivot point protrusion 230 where a second footing pivot point protrusion is opposite the first footing pivot point protrusion 230, but not shown in the figure.

FIG. 3 is a cross-sectional view 300 of the exemplary launch tube embodiment of FIG. 1 showing four structural panels 141-144 disposed about a launch tube centerline. A non-cylindrical UAV may be placed and launched from such a volume. Each panel is shown having an outer surface curvature 311 representative of a radius of curvature 322 greater than the distance 323 from the outer surface 350 to the launch tube centerline 360. Each panel 141-144 is shown having a planar inner surface 312 representative of a chord length 313. Accordingly, an end face 314 of each panel 141-144 in the present cross-sectional view is a circular segment. Each panel is shown disposed between an inner layer of prepreg substrate 370 and an outer layer of prepreg substrate 380. The panels are shown disposed apart from one another, with there being space 390 between the lateral edges 318, 319 of the panels. Accordingly, the inner layer of prepreg substrate 370 and the outer layer of prepreg substrate 380 contact one another at the corners 301-304 of the right parallelepiped-shaped volume 305. The outer layer of prepreg substrate 380 defines in cross-sectional view, a substantially ovoid-shaped outside perimeter. In some embodiments the inner layer 370 and outer layer 380 may comprise epoxy prepreg Kevlar™ or a composite material, or combinations of both, and the structural panels may comprise balsawood or a light weight composite material, or combination of both.

Figures 4, 5:
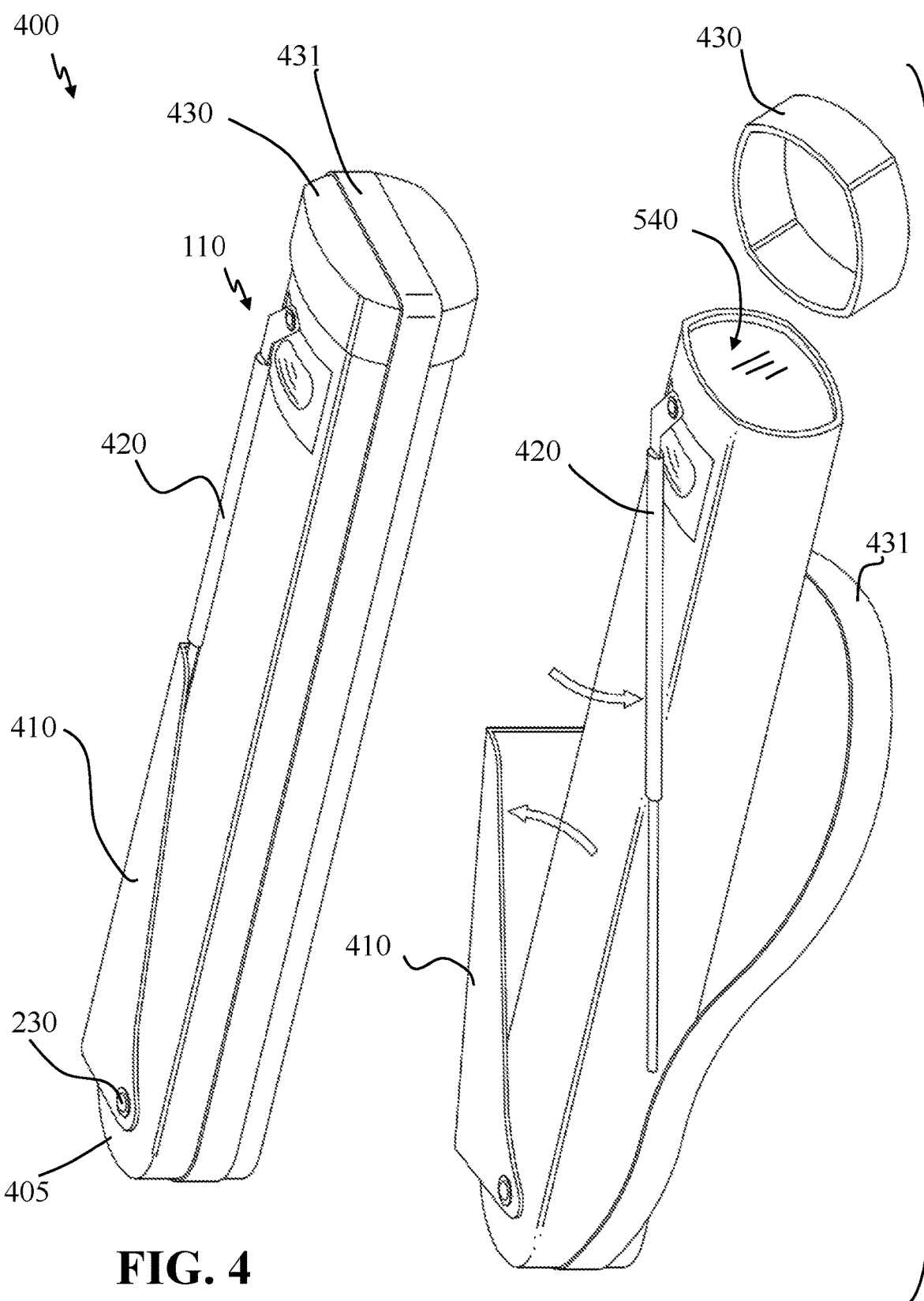
FIG. 4 is an exemplary depiction of a launch tube configured as a UAV carrying case embodiment of the present invention.
FIG. 5 is an exemplary depiction of a launch tube configured as a UAV carrying case embodiment of the present invention.

FIG. 4 is an exemplary depiction of a launch tube configured as a UAV carrying case 400 embodiment. A footing 410 is shown rotatably attached to the launch tube 405 via a footing pivot point protrusion 230. A first strut or leg 420 is shown rotatably attached to the launch tube 405 proximate to the top 110 of the launch tube. A second strut or leg is disposed opposite the first strut and is not shown in this figure. A cap 430 is shown covering the otherwise open end of the launch tube and is shown restrained by a circumferential strap 431.

FIG. 5 is an exemplary depiction of a launch tube configured as a UAV carrying case embodiment in a partially deployed state. That is, the cap 430 is shown removed, exposing the open end of the launch tube that may have an optional membrane seal 540 as shown. The seal 540 may be a frangible film applied to repel sand, soil, moisture, and/or grit from entering the launch tube during pre-launch preparations. The footing 410 is shown partially rotated away from the launch tube and the first strut or leg 420 is shown partially rotated into a support position.

Figure 6:
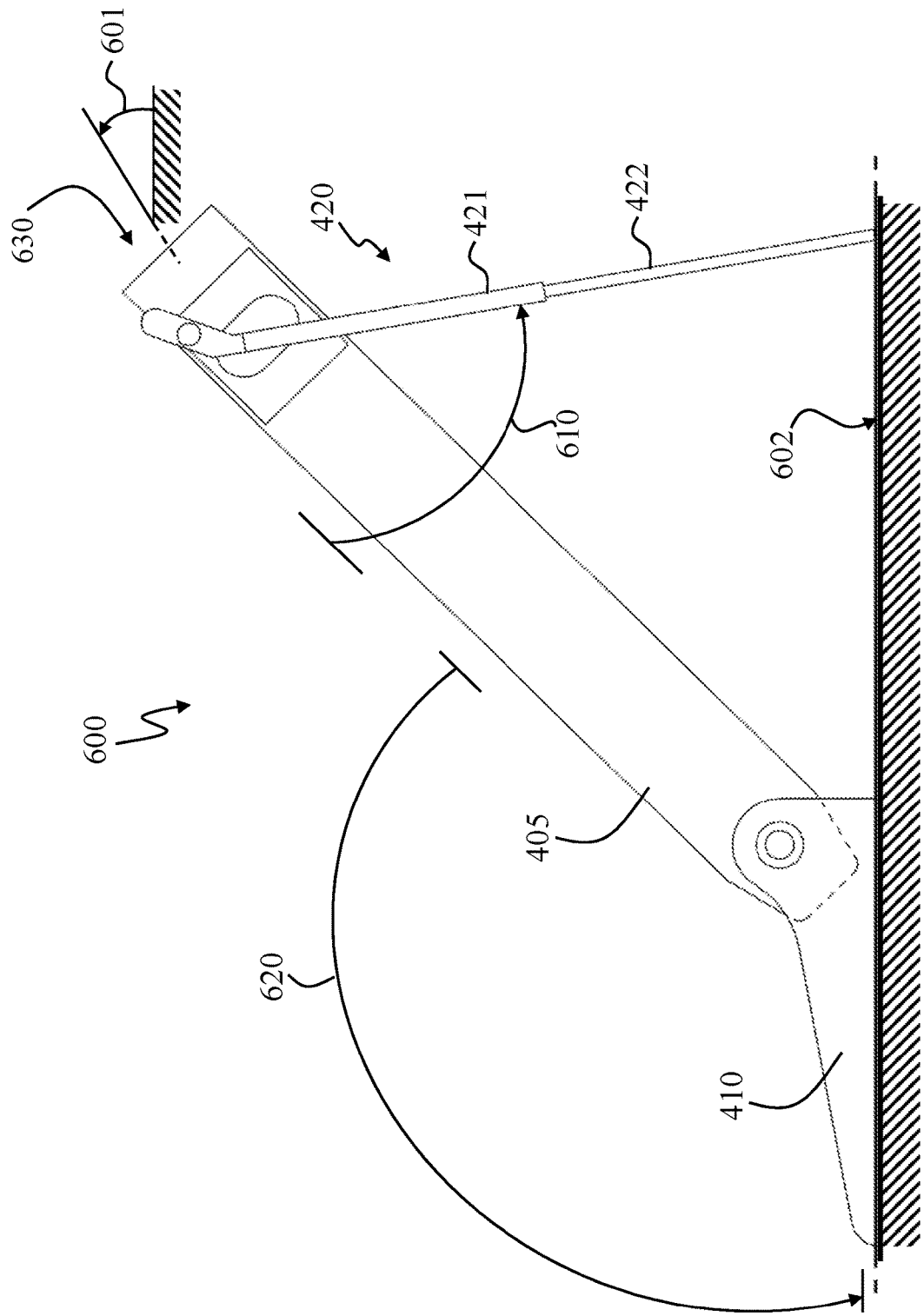
FIG. 6 is an exemplary depiction of a launch tube configured as a UAV carrying case embodiment with support struts and footing deployed.

FIG. 6 is an exemplary depiction of a launch tube 600 configured as a UAV carrying case embodiment with support struts 420 and footing 410 deployed. The use of the term "tube" is done so with the intent to indicate a volume from which a UAV may be launched and not to limit the shape of the volume to a cylindrical tube. The angle 610 of the pair of struts or pair of legs may be adjusted to accommodate a desired launch angle 601 relative to local level 602. Likewise, the angle 620 between the launch tube and the footing may be adjusted to accommodate the desired launch angle 601. In some embodiments, the pair of struts or pair of legs 420 may comprise segments of differing diameters allowing for a telescoping of the distal segment 422 into and out of the proximal segment 421. In these embodiments, the overall length of the legs may be adjusted, either to accommodate uneven local terrain, and to accommodate a desired launch angle 601, or both. The footing 410 may be sized to receive the down force from a boot and/or a mass to further enhance the stiction between the lower surface of the footing and the local ground surface 602. The top of the launch tube 630 may include a frangible membrane to protect the internal launcher volume from grit, sand, moisture and the effects of weather. Once the launcher is positioned on a surface, the launcher 600 may be remotely controlled for purposes of uploading mission information to the UAV while the UAV is in a pre-launch state and for purposes of receiving UAV status information.

Embodiments include an unmanned aerial vehicle (UAV) launch tube that may comprise a tethered sabot configured to engage a UAV within a launcher volume defined by an inner wall, the tethered sabot dimensioned to provide a pressure seal at the inner wall, and tethered to the inner wall. In some embodiments, the tethered sabot may be hollow having an open end oriented toward a high pressure volume and a tether attached within a hollow of the sabot and attached to the inner wall retaining the high pressure volume.

For a launcher having a right parallelepiped aperture, an exemplary tethered sabot 700 embodiment as depicted in FIG. 7 may be used. The sabot may be made of carbon fiber, e.g., a prepreg carbon fiber shaped over a form and cured to yield a hollow article, open at one end. The sabot may have a channel 710 for receiving a pusher propeller assembly of a UAV. The sabot may also have a depression 720 for receiving gas outside of the volume provided by the hollow. The sabot is shown depicting an end portion 730 of a structural element that may span the width of the sabot to provide for a structural attachment for a tether. A portion of a tether 740 is shown extending from the hollow of the sabot.

FIG. 8 is a top view of an exemplary tethered sabot 700 embodiment. The structural element 810 may be a rod, and may span the width of the sabot 700. A loop portion 820 of the tether may engage the structural element 810. The tether 740 may be silicone prepreg, braided Kevlar™ where an end of the tether 740 may be tucked within the braiding of the tether 740 after looping the structural element 810 and further cured.

FIG. 9 is a cross-sectional view of the sabot 700 taken from the top view of FIG. 8 depicting the tether 740 engaging the structural element 810 within the hollow 910 of the sabot 700.

Figures 10A, 10B, 10C:
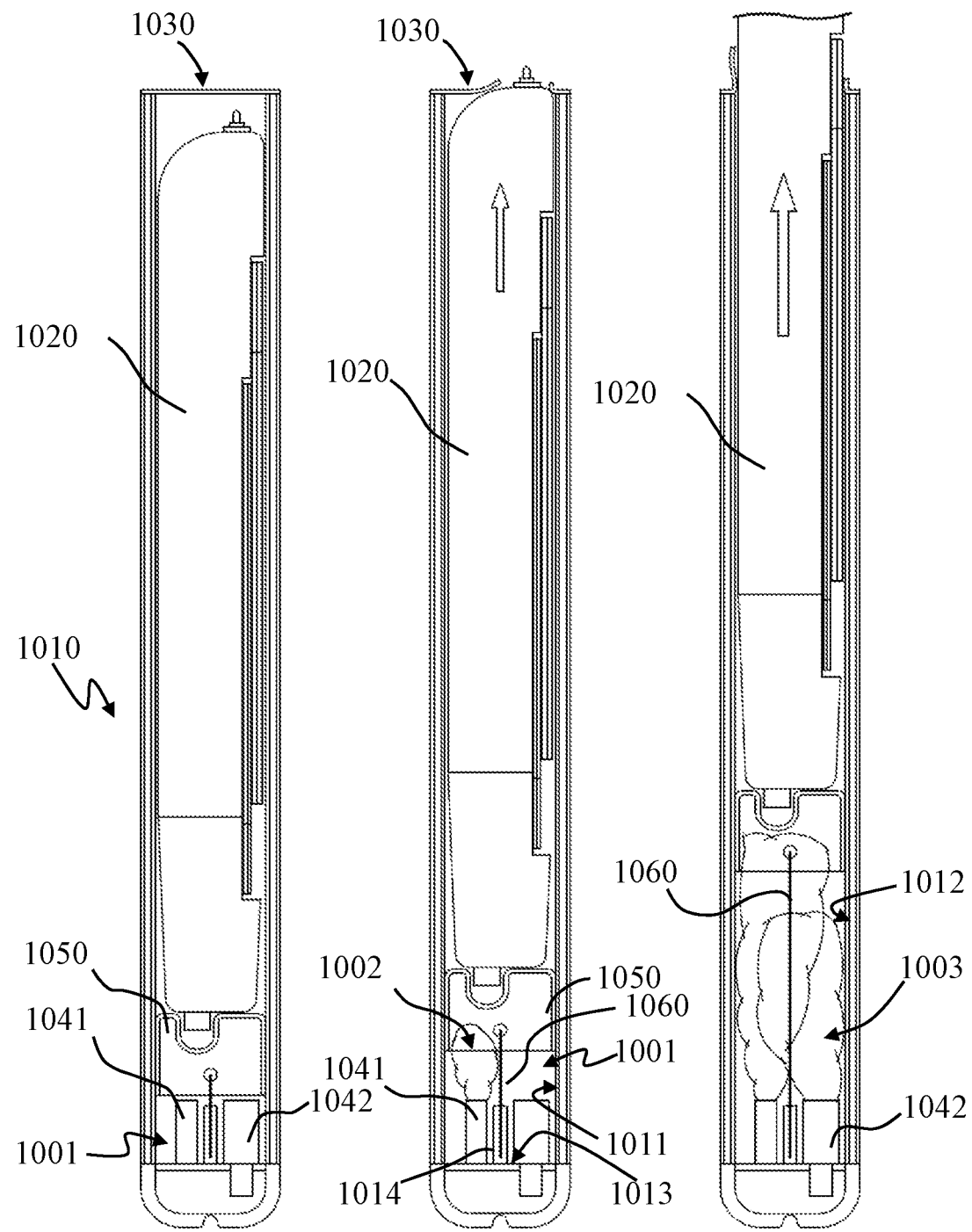

FIG. 10A illustrates a cross-sectional view of a loaded launcher 1010, such as the launcher depicted in FIGS. 1 and 2; loaded with a UAV 1020 such as the UAV depicted in FIG. 3. In this example, the launcher 1010 is shown having an optional frangible seal 1030. Two gas-generating canisters 1041, 1042 are shown disposed within the aft volume 1001 of the launcher 1010. An exemplary tethered sabot 1050 is shown disposed between the gas-generating canisters 1041, 1042 and the UAV 1020.

FIG. 10B illustrates, in the cross-sectional view of FIG. 10A, a first gas-generating canister 1041 increasing the pressure—as depicted by the smoke cloud 1002—within the volume 1001 between the inner aft wall 1011 of the launcher 1010 and the sabot 1050. The tether 1060 may be attached to the inner base wall 1013 via a tether reel or winding element 1014. Relative to FIG. 10A, the sabot 1050 is shown displaced along the launch tube—in this example a right parallelepiped volume—and moving with it the UAV 1020. The UAV is shown breaking the frangible seal 1030 and beginning to exit the launcher 1010.

FIG. 10C illustrates, in the cross-sectional view of FIG. 10A, the second gas-generating canister 1042 increasing, or sustaining, the pressure (as depicted by the second smoke cloud 1003) within the volume between the inner aft wall 1012 of the launcher 1010 and the sabot 1050. The sabot 1050 is shown displaced further along the launch tube, the tether 1060 is shown in a payout length, and, moved with the sabot 1050, the UAV 1020 is shown substantially outside of the launcher.

FIG. 10D illustrates, in the cross-sectional view of FIG. 10A, the sabot 1050 fully displaced within the launch tube, constrained from further travel by the tether 1060, and retaining the gas within the launcher volume.

FIG. 10E illustrates, in the cross-sectional view of FIG. 10A, the sabot 1050 fully displaced within the launch tube, constrained from further travel by the tether 1060, and retaining the gas within the launcher volume and allowing the seeping 1090 of gas from the launcher volume into the surrounding atmosphere.

Figures 11A, 11B:
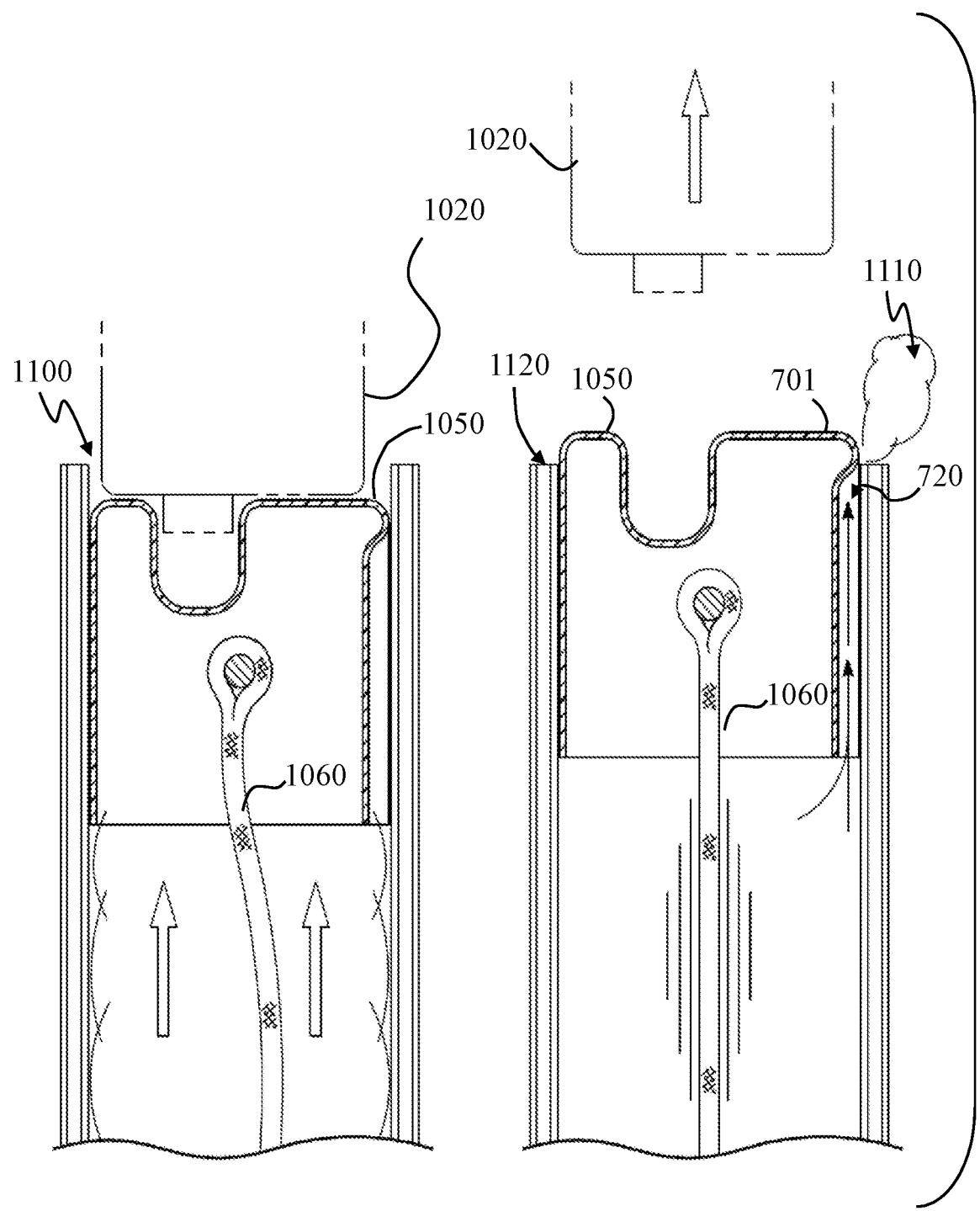
FIGS. 11A-11B depict, in a cross-sectional view of the distal end of a lunch tube, an exemplary UAV launch using a tethered sabot embodiment of the present invention.

FIG. 11A depicts, a cross-sectional view of the distal, an unsealed, end of a lunch tube 1100, as the sabot 1050 approaches full payout as depicted in FIG. 10D. In some embodiments using hot or warm gas generators, the sabot 1050 travels approximately no further than the location depicted in FIG. 11A, and a seepage of gas to atmosphere is around the sabot as the sabot may shrink in a cooling cycle from having been heated by the gas. In some embodiments using warm or cool gas generators, the sabot 1050 may travel to partially extend from the rim 1120 of the launcher (FIG. 11B) where gas may seep 1110 from the side depression 720 once the sabot lip 701 has cleared the launcher rim 1120. By retaining the sabot 1050 via the tether 1060, the launcher retains, for a brief period, a substantial portion of the pressure waves, i.e., the report, and heat produced by rapid gas generation. Post-launch, the launcher diffuses the pressure from the launcher via seepage about the sabot 1050.

In some embodiments, the sabot 1050 may expand out to contact the inner wall or walls of the launcher due to the pressure exerted on the interior of the sabot 1050 by the gas from the gas generators. This expansion can cause, or at least facilitate, the formation of a seal between the sabot 1050 and the inner wall or walls and in doing so prevent or limit the passage of gas around the sabot 1050 during its movement along the tube. In certain embodiments, the sabot may be configured to form gaps between the sabot and the inner wall or inner walls of the launcher. The size of such gaps may be set to provide a desired amount of gas leakage. In some embodiments, the sabot 1050 may be sized to allow enough gas leakage to prevent the launcher from becoming too hot from containing the launch gases such that the structural integrity of the launcher is compromised or breached. Accordingly, sabot 1050 embodiments may be sized to limit gas leakage to limit the sound propagation of the sonic waves generated during the launch process.

Figure 12A:
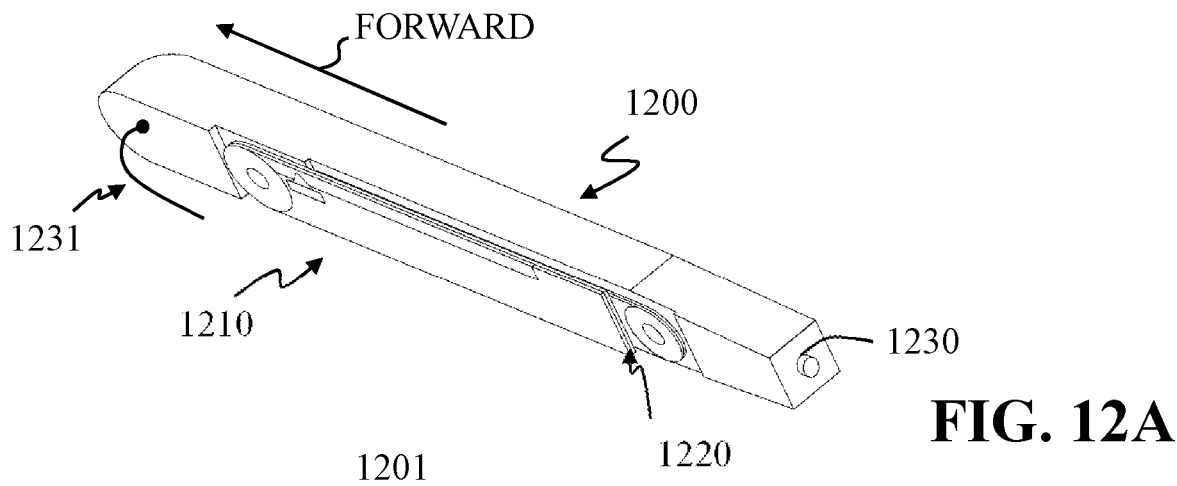
FIG. 12A is a bottom-side perspective view of an exemplary UAV in a pre-launch state.
Figure 12B:
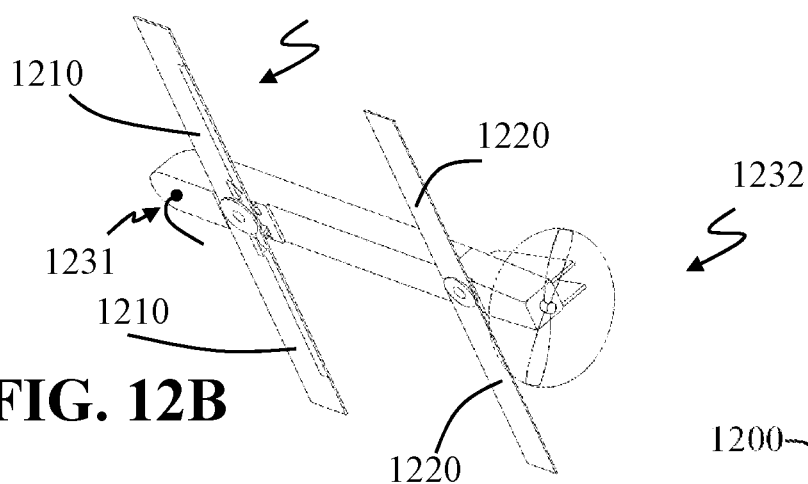
FIG. 12B depicts an exemplary UAV with its airfoils deployed and its pusher propeller rotating.

FIG. 12A depicts, in a bottom-side perspective view, an exemplary UAV in a pre-launch state 1200, i.e., with its wing 1210 and tail surfaces 1220 folded beneath the fuselage of the vehicle. Also shown is a propeller hub 1230 about which a propeller may be rotatably mounted. The air vehicle may include a radio frequency (RF) antenna 1231 conformal with or extending from the vehicle. Whether the tube volume is a right cylinder, a right parallelepiped, or some other shape, the cross-section or cross-sections of the UAV may be insufficient to maintain an air-tight fit between the vehicle and the inner walls of the launcher. Accordingly, for launches based on gas pressure, a sabot may be disposed between the gas source and the UAV. FIG. 12B depicts an exemplary UAV in a launched state 1201 with its airfoils 1210, 1220 deployed and its pusher propeller 1232 rotating.

Figure 13:
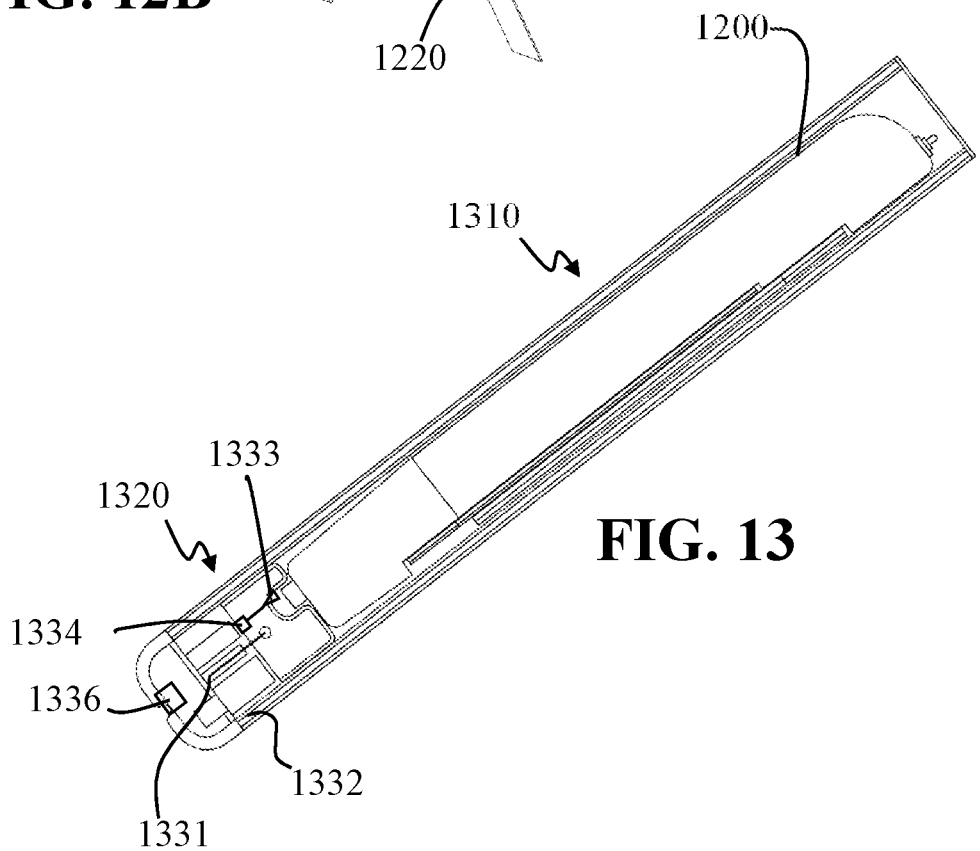
FIG. 13 is a bottom-side perspective view of a portion of an exemplary launch tube embodiment.

FIG. 13 is a side elevational view of the air vehicle 1300 embodiment loaded into a forward portion of a launcher 1310. The aft portion of the launcher 1320 is shown having a pair of gas-generating canisters 1331, 1332 and may include an RF antenna 1333 and receiver unit 1334, and a power source 1336, such as a battery for powering the launcher. In some embodiments the power source 1336 can also power the UAV 1300 while it is in the launcher 1310, allowing for maximum battery life for the UAV's battery after leaving the launcher 1310. Balsawood and epoxy prepreg Kelvar™ are examples of structural elements having high RF permeability. Accordingly, RF antenna and receiver elements of the UAV and/or RF antenna and receiver elements of the launch propulsion unit may receive RF commands from a command node with negligible signal attenuation due to the launcher structure.

Figure 14:
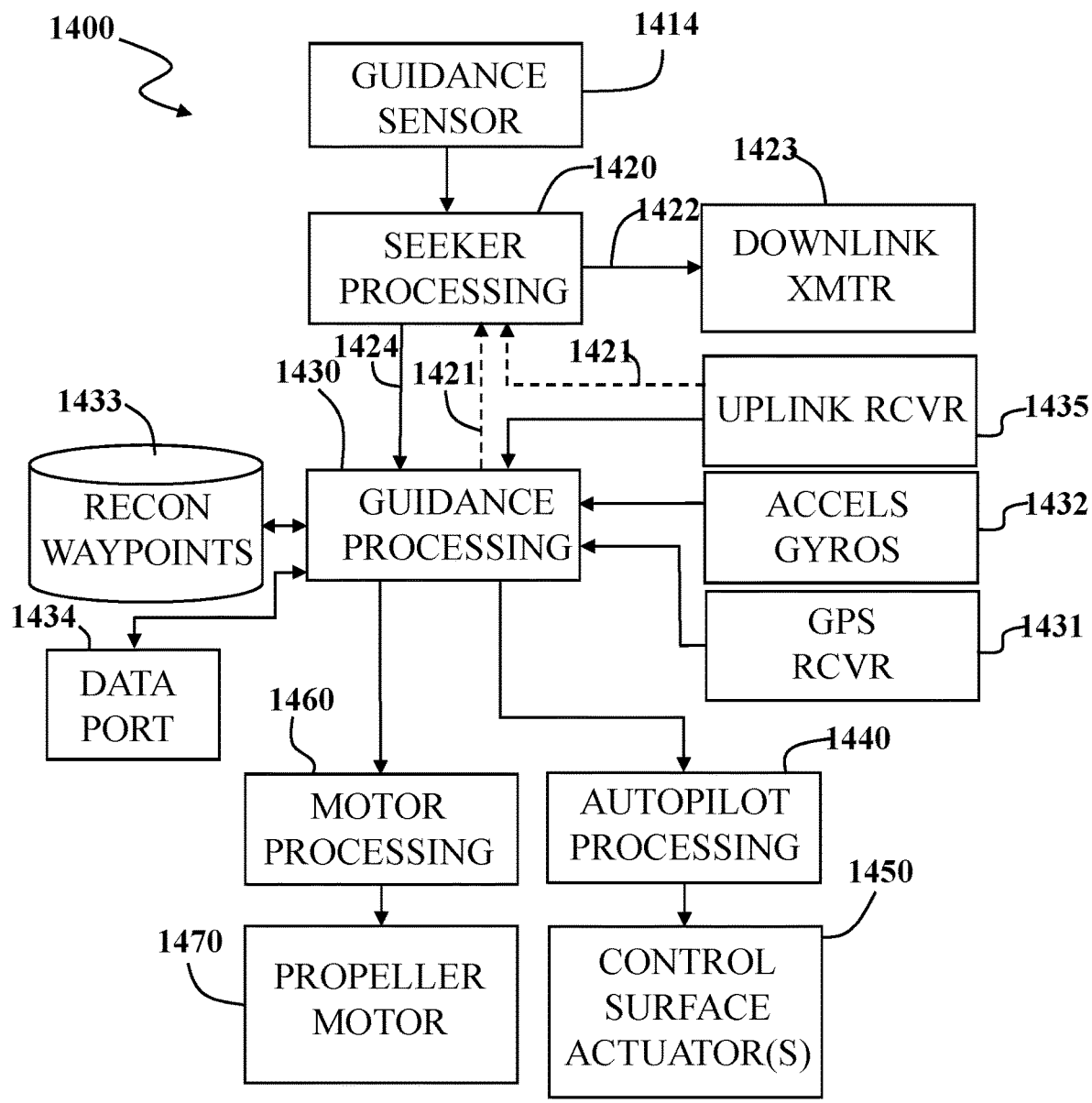
FIG. 14 depicts an exemplary functional block diagram of the UAV processing and guidance and control subsystem.

FIG. 14 depicts an exemplary functional block diagram of the UAV processing and guidance and control subsystem 1400 where the guidance sensor 1414 provides information about the external environment pertaining to seeking processing of a seeker processing 1420. A guidance sensor 1414, and more generally, a guidance sensor suite, may include a passive and/or active radar subsystem, an infrared detection subsystem, an infrared imaging subsystem, a visible light imaging subsystem such as a video camera-based subsystem, an ultraviolet light detection subsystem, and combinations thereof. The seeker processing 1420 may include both image processing and target tracking processing, and target designation or re-designation input 1421 that may be received from an uplink receiver 1435 and/or as an output of a guidance process 1430. The image processing and/or target tracking information 1422 may be transmitted via a downlink transmitter 1423, which may be a part of an uplink/downlink transceiver. The guidance processor 1430, in executing instructions for guidance processing, may take in the target information 1424 from the seeker processing 1420, and UAV flight status information such as position, velocity and attitude from the GPS receiver 1431, and gyroscopes and accelerometers 1432, if any. Once in flight, the guidance processor 1430, to receive reconnaissance waypoints and/or surveillance optimizing trajectories, may reference a memory store 1433. For system embodiments, the guidance process 1430 may receive, by way of an external data port 1434, e.g., during a pre-launch phase, or by way of an uplink receiver 1435, e.g., during a post-launch phase, receive and/or upload reconnaissance waypoints and/ or surveillance optimizing trajectories. The guidance processor 1430, as part of executing instructions for determining flight path, a trajectory, or a course steering angle and direction, may reference the waypoint and/or surveillance optimizing trajectory information, particularly when not in a terminal homing mode. The guidance processor 1430 may receive a command via an uplink receiver 1435 to set an initial post-launch mode or flight plan. The uplink receiver 1435 may receive commands, target data, and or flight plan information from a communications node while the UAV is in a pre-launch state.

An example of a terminal homing mode may be proportional navigation with a gravity bias for strike sub-modes of the terminal homing mode, and an acceleration bias for aerial intercept sub-modes of the terminal homing mode. The guidance processing 1430 and autopilot processing 1440 may execute instructions to effect a bank-to-turn guidance, for example, in an elevon embodiment, to redirect the air vehicle by re-orienting its velocity vector. For example, one or more control surfaces may be re-oriented via one or more control surface actuators 1450 causing forces and torques to reorient the air vehicle and the portion of its linear acceleration that is orthogonal to its velocity vector. The portion of the linear acceleration of the air vehicle that is along the velocity vector is greatly affected by aerodynamic drag, and the linear acceleration may be increased via a motor processor 1460 and a propeller motor 1470. For embodiments with full three-axis control, additional control topologies may be implemented including skid-to-turn and other proportion-integral-differential guidance and control processing architectures as well. The seeker processing 1420, guidance processing 1430, motor processing 1460, and/or autopilot processing 1440 may be executed by a single microprocessor having addressable memory and/or the processing may be distributed to two or more microprocessors in distributed communication, e.g., via a data bus.

Figure 15:
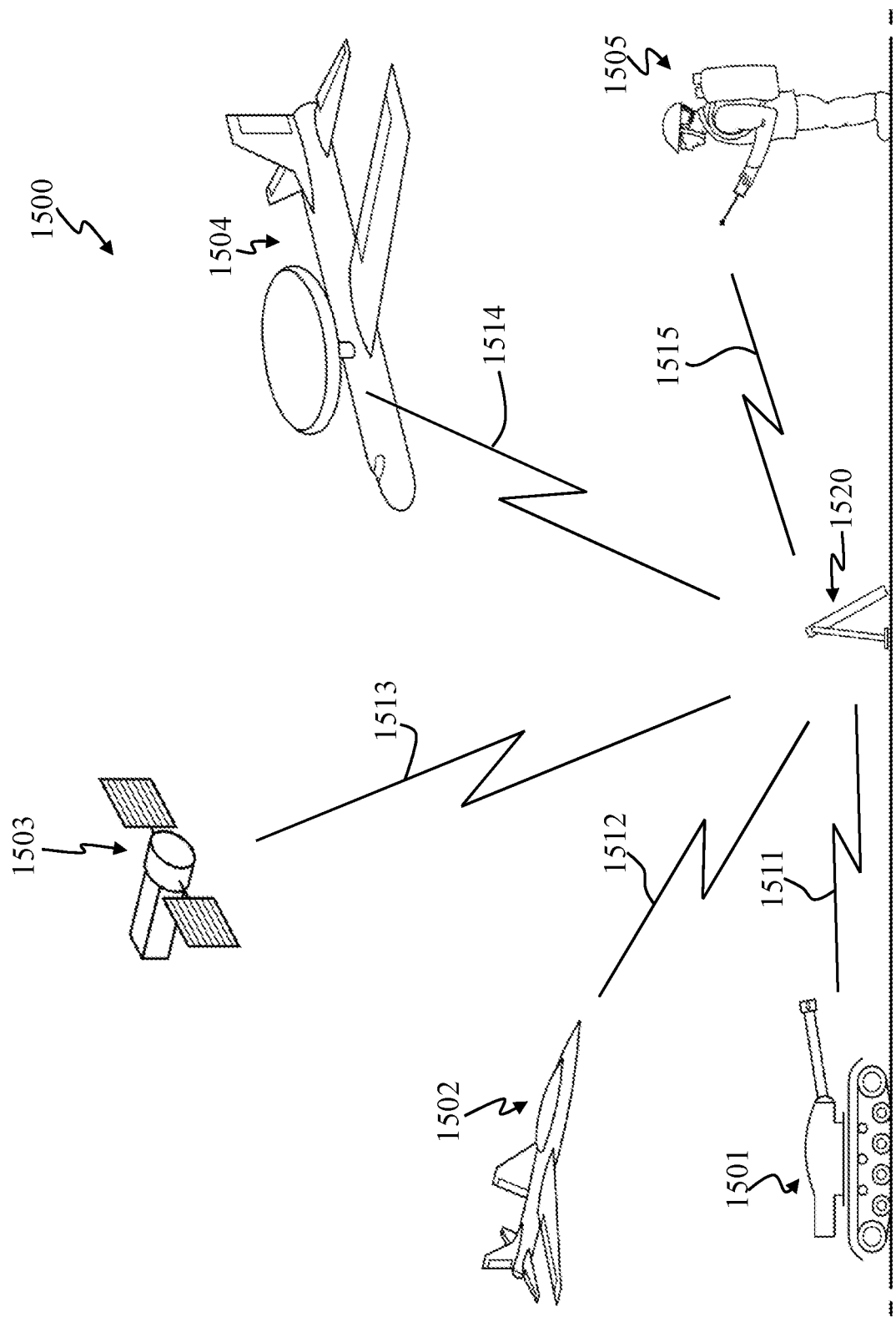
FIG. 15 is a top-level system architecture of a system embodiment.

FIG. 15 is a top-level system architecture of a system 1500 embodiment. Ground vehicles 1501, aircraft 1502, spacecraft 1503, airborne surveillance or airborne communication nodes 1504, or ground, human-portable, communication nodes 1505 may transmit command signals via an RF link 1511-1515 to a launcher 1520 embodiment, that may be, for example, the embodiment depicted in FIG. 13. In some embodiments, the UAV, in a pre-launch state, may output along an RF link 1511-1515 to a requesting node 1501-1505, status information, e.g., battery levels, and the results of self-diagnostics. Launcher embodiments provide for a self-contained RF node via the UAV contained in the launcher. For example, the UAV may be placed in a standby mode, and remain responsive to a received RF signal that may command a full power-up, and thereafter the UAV in the launcher may be ready to be committed to launch—e.g., by an RF command of an offsite command node. The self-contained launcher-UAV may be deployed and left at a prospective launch site for a protracted period of time, and thereafter may be powered up and launched responsive to one or more command signals from an offsite or otherwise remote command node.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method comprising:
    transmitting, by a transmitter disposed within a launcher volume of a launcher, wireless communication via one or more RF signals transmitted wirelessly through a launcher wall of the launcher, wherein the launcher volume is defined by the launcher wall, and wherein the launcher wall comprises a continuous radio-frequency (RF) permeable material.

2. The method of claim 1 further comprising:
    receiving, by a receiver disposed within the launcher volume of the launcher, wireless communication via one or more RF signals received wirelessly through the launcher wall of the launcher.

3. The method of claim 2, wherein the received one or more RF signals are received by an RF antenna disposed within the launcher volume.

4. The method of claim 2 further comprising:
    transmitting, by an external communications node, the one or more RF signals received by the receiver disposed within the launcher volume of the launcher.

5. The method of claim 2, wherein the one or more RF signals received by the receiver comprise at least one of: a reconnaissance waypoint information, a surveillance optimizing trajectory information, a target data, and a flight plan information.

6. The method of claim 1, wherein the transmitter is positioned to transmit wirelessly through the launcher wall of the launcher.

7. The method of claim 1 further comprising:
    generating gas by one or more gas generating canisters during a launch of an unmanned aerial vehicle (UAV) disposed within the launcher volume; and
    retaining the generated gas within the launcher volume after the launch of the UAV.

8. The method of claim 1, wherein the transmitted wireless communication comprises a status of an unmanned aerial vehicle (UAV) disposed within the launcher volume.

9. The method of claim 1, wherein the transmitted wireless communication comprises a status of the launcher.

10. The method of claim 9, wherein the status of the launcher comprises at least one of: a battery level and a result of a self-diagnosis.

11. A method comprising:
    engaging an unmanned aerial vehicle (UAV) within a launcher volume by a sabot, wherein the launcher volume is defined by an inner wall, wherein the sabot is dimensioned to provide a pressure seal at the inner wall, and wherein the sabot is tethered to the inner wall.

12. The method of claim 11 further comprising:
    orienting an open end of the sabot toward a high pressure volume, wherein the tethered sabot is hollow.

13. The method of claim 12 further comprising:
    attaching the tether within a hollow of the sabot.

14. The method of claim 13 further comprising:
attaching the tether to the inner wall retaining the high pressure volume.

15. The method of claim 14 wherein the tether has a payout length that prevents the sabot from fully exiting the launcher volume.

16. The method of claim 11 further comprising:
generating gas by one or more gas generating canisters during a launch of the UAV disposed within the launcher volume.

17. The method of claim 16 further comprising:
retaining the generated gas within the launcher volume after the launch of the UAV.

18. The method of claim 16 further comprising:
forming a high-pressure volume between the sabot and the one or more gas generating canisters during the launch of the UAV.

19. The method of claim 11 further comprising:
applying a membrane seal over an open end of the launcher volume thereby preventing outside elements from entering the launcher volume prior to launch.

20. The method of claim 19 further comprising:
applying a cap over the membrane seal.

\* \* \* \* \*